United States Patent [19]

Sekine et al.

[11] Patent Number: 5,071,299
[45] Date of Patent: Dec. 10, 1991

[54] NUT FIXING STRUCTURE FOR RESINOUS CASE

[75] Inventors: Shuji Sekine; Naoto Harada, both of Yokohama, Japan

[73] Assignee: Jidosha Denki Kogyo K.K., Kanagawa, Japan

[21] Appl. No.: 682,894

[22] Filed: Apr. 9, 1991

Related U.S. Application Data

[63] Continuation of Ser. No. 482,478, Feb. 21, 1990, abandoned.

[30] Foreign Application Priority Data

Feb. 22, 1989 [JP] Japan ................................. 1-20062[U]

[51] Int. Cl.⁵ .............................................. F16B 37/04
[52] U.S. Cl. .................................... 411/183; 411/176; 403/200; 29/444; 29/512
[58] Field of Search ............... 411/183, 177, 180, 176, 411/173, 174, 172, 171, 967, 179, 103, 105, 181, 108, 109, 501, 502, 57, 58; 403/22, 179, 276, 274, 337, 277, 200, 199, 195; 74/606 R; 29/512, 444, 443

[56] References Cited

U.S. PATENT DOCUMENTS

| | | | |
|---|---|---|---|
| 574,139 | 12/1896 | Curry | 411/183 X |
| 1,873,869 | 8/1932 | Carr | 411/183 |
| 1,979,686 | 11/1934 | Hall et al. | 411/58 |
| 2,255,649 | 9/1941 | Burke | 411/176 |
| 2,310,532 | 2/1943 | Langmaid | 411/177 X |
| 2,359,031 | 9/1944 | Goshia | 411/183 |
| 2,784,758 | 3/1957 | Rohe | 411/171 |
| 3,091,842 | 6/1963 | Creamer | 411/176 X |
| 3,561,093 | 2/1971 | Gulistan | 29/512 X |
| 3,750,259 | 8/1973 | Timmons | 411/922 X |
| 4,059,199 | 11/1977 | Quaney | 411/965 X |
| 4,971,497 | 11/1990 | Stoffer et al. | 411/108 |

FOREIGN PATENT DOCUMENTS

| | | | |
|---|---|---|---|
| 735483 | 5/1943 | Fed. Rep. of Germany | 411/173 |
| 828210 | 2/1960 | United Kingdom | 411/177 |

Primary Examiner—Rodney M. Lindsey
Attorney, Agent, or Firm—Sughrue, Mion, Zinn, Macpeak & Seas

[57] ABSTRACT

A nut fixing structure for a resinous case which comprises a nut provided with an antirotative flange and caulking clicks on its respective ends, and a resinous case provided with a nut fitting hole and a flange receiving part. The nut is fixed in the nut fitting hole of the resinous case by bending the caulking clicks outwardly in the state of fitting the nut into the nut fitting hole and engaging the antirotative flange to the flange receiving hole. It is possible to fix the resinous case to the mounting position very firmly.

4 Claims, 3 Drawing Sheets

NUT FIXING STRUCTURE FOR RESINOUS CASE

This is a continuation of application Ser. No. 07/482,478 filed Feb. 21, 1990 now abandoned.

BACKGROUND OF THE INVENTION

1. Field Of The Invention

This invention relates to a nut fixing structure for a resinous case used for fixing a nut to the resinous case on the occasion of mounting, for example, the resinous gear case provided for a power window motor for a motor vehicle on the vehicle body using a bolt compatible with said nut.

2. Description Of The Prior Art

Heretofore, for example, in case of mounting a power window motor on the vehicle body, the motor is fixed to the vehicle body by tightening a bolt passed through a motor setting bracket provided on the vehicle body into a nut embedded into a resinous gear case provided for said motor by the insert molding process.

In this case, as shown in FIG. 7, protruding portions 53 having respective through holes 52 are formed at plural places on the outer periphery of a gear case 51, and a nut 52a is provided to the reverse side in FIG. 7 of the protruding portion 53 corresponding to a bolthole in the bracket by the insert molding process. The gear case 51 is fixed to the bracket by tightening the bolt into said nut 52a through the through hole 52.

However, when the gear case 51 is fixed to the motor setting bracket by tightening the bolt into the nut 52a insert-molded in the resinous gear case 51 at the time of mounting the power window motor on the vehicle body as described above, a gap may appear between the gear case 51 and the nut 52a due to difference of their thermal expansivity under the environment with outstanding temperature changes, and there is the possibility that play comes out between said power window motor and the motor setting bracket owing to looseness of the nut 52a. There is a problem since there is the possibility that the circumference of the nut 52a of the gear case 51 crumbles and the protruding portion 53 is cracked in case of applying tightening torque to the bolt too much.

Furthermore, there is another problem in that the manufacture of the resinous gear case 51 provided with the nut 52a by insert molding process can not necessarily contribute to the decrease of the cost.

SUMMARY OF THE INVENTION

This invention is made in view of the aforementioned problems of the prior art, and an object of the invention is to provide a nut fixing structure for a resinous case which is free from occurence of the play between the power window motor and the motor setting bracket even under severe environment changes in temperature and free from trouble such as a crack in the gear case of the power window motor even if the bolt is tightened too much, and which is possible to contribute to the decrease of the cost in the case where the resinous gear case provided for the power window motor is fixed to the motor setting bracket by tightening with the bolt at the time of mounting the motor on the vehicle body.

The construction of the nut fixing structure for the resinous case according to this invention for attaining the aforementioned object is characterized by comprising an antirotative flange provided to one end of a nut, a plurality of outwardly bendable tabs provided to another end of said nut, a plurality of contact pieces disposed between said bendable tabs, a nut fitting hole provided to the resinous case, a flange receiving recess provided about said nut fitting hole for engaging with the antirotative flange of said nut, and said nut being fixed to the nut fitting hole of the resinous case by bending the tabs of the nut outwardly at the state in which said nut is fitted into the nut fitting hole and said antirotative flange is engaged with the flange receiving part of said nut fitting hole.

In the nut fixing structure for the resinous case, by inserting the tab end of the nut into the nut fitting hole of the resinous case from the flange receiving part-side and fitting the nut into the nut fitting hole so as to engage the antirotative flange of the nut with said flange receiving part, the nut is prevented from movement in the rotational direction. In this state, by bending the tabs outwardly and fixing them against the end part of the nut fitting hole, the nut is prevented from movement in the axial direction, so that the nut is fixed firmly to the resinous case.

In the case of fixing the resinous case to, for example, the bracket, the resinous case is fixed to the bracket without receiving immoderate force because the contact pieces of the nut contact the bracket at the time of screwing the bolt into the nut to prevent damage to the resinous case due to excessive bolt tightening the resinous case should be provided with a minimum of five nut receiving holes so that the case can readily be mounted on various mounting brackets depending on the mounting position.

BRIEF DESCRIPTION OF THE DRAWINGS

FIG. 1 and FIG. 2 are a front view and a rear elevation illustrating the resinous gear case provided to the power window motor for the motor vehicle, respectively;

FIG. 3 is a enlarged detail illustrating the protruding portion in circle III shown in FIG. 2;

FIG. 4 is a sectional view along section lines IV—IV shown in FIG. 3;

FIG. 5 and FIG. 6 are a detailed front view and a detailed sectional side view illustrating the nut, respectively.

DESCRIPTION OF THE PREFERRED EMBODIMENT

An embodiment of the nut fixing structure for the resinous case according to this invention will be described below on basis of drawings.

FIG. 1 to FIG. 6 show an embodiment of the nut fixing structure for the resinous case according to this invention, the case where a nut is fixed to a resinous gear case provided to a power window motor for a motor vehicle is exemplified in this embodiment.

Figure 1:
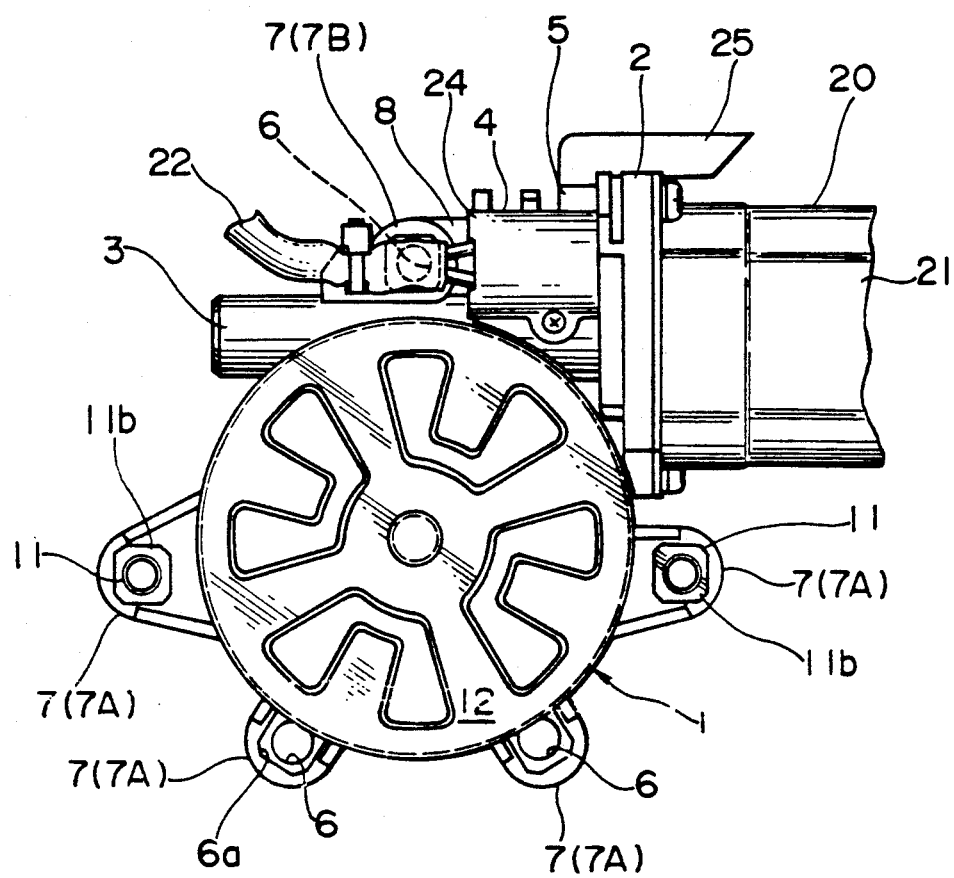
FIG. 1 to FIG. 6 show an embodiment of the nut fixing structure for the resinous case according to this invention.
Figure 2:
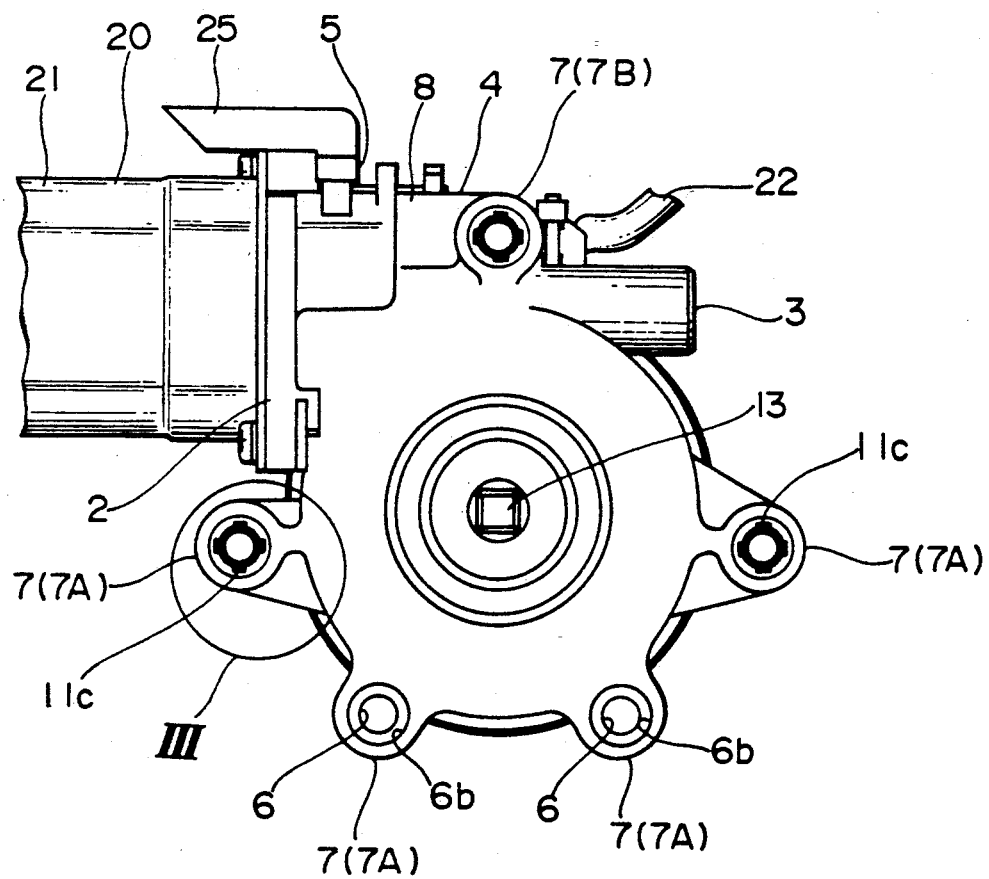

That is, as shown in FIG. 1 and FIG. 2, a resinous gear case 1 has a flat bottomed cylindrical shape approximately, and is provided on the outer periphery with an end bracket 2 for connecting to a motor case 21 of a power window motor 20, a bearing part 3 for receiving an end of an output shaft (not shown) of said motor 20, a lead wire connector 4 for connecting a lead wire 22 to supply said motor 20 with electric power to a holder base (not shown) disposed between said end bracket 2 and the motor case 21, and a cap holder 5 for fitting a breather cap 25 to take air in the inner part of the lead wire connector 4 closed up by a breather cover 24 in one body.

Said resinous gear case 1 is provided with protruding portions 7(7A) formed with a nut fitting hole 6 at plural places (that is, four places in this embodiment) on the outer periphery excepting the space occupied by said end bracket 2, the bearing part 3, the lead wire connector 4 and the cup holder 5, and also provided with a protruding portion 7(7B) formed with a nut fitting hole 6 and adjacent to said bearing part 3 (said protruding portion 7B is formed to the bearing part 3 continuously through a reinforcement 8).

Figure 5:
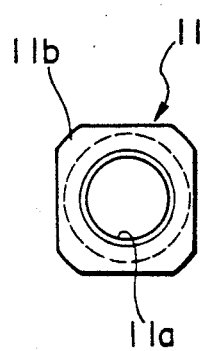
Figure 6:
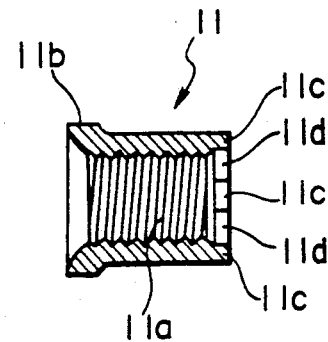
Figure 7:
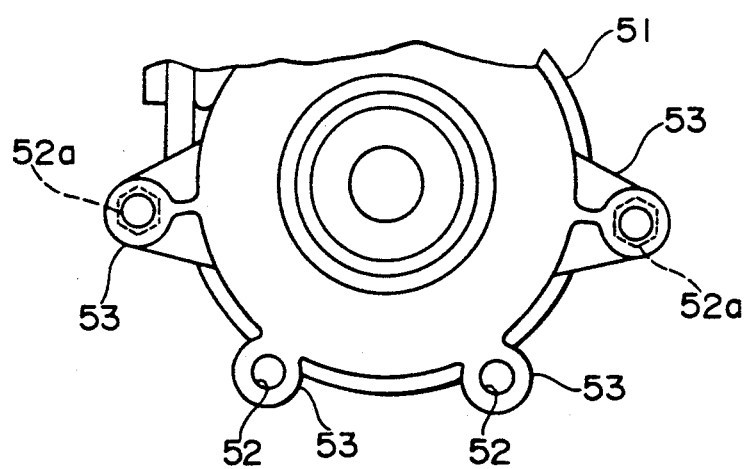
FIG. 7 is a fragmentary rear elevation illustrating the example of the conventional resinous gear case provided with nuts molded by the insert molding process.

Meanwhile, a nut 11 has a nearly cylindrical shape as shown in FIG. 5 and FIG. 6, and is formed with a screw-thread 11a on the inner periphery thereof. Said nut 11 is provided with a rectangular shaped antirotative flange 11b on one end thereof (the end on left side in FIG. 6), and is provided with bendable tabs 11c which can be bent outwardly at plural places (that is, four places in this embodiment) on another end thereof (the end on right side in FIG. 6).

The nut 11 is fitted and fixed in the nut fitting hole 6 of respective three protruding portions 7 among the protruding portions 7 on said resinous gear case 1 (the protruding portions 7A on the left and right side in FIG. 1 and the protruding portion 7B adjacent to the bearing part 3.

Figure 4:
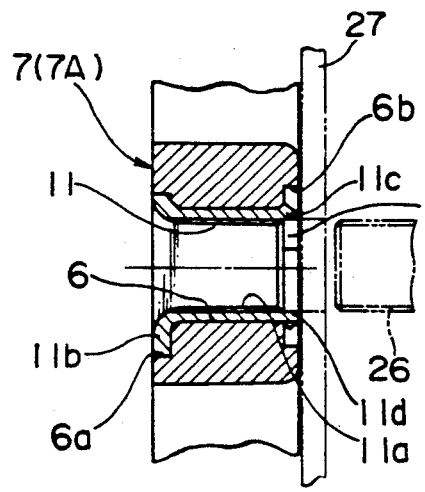
Figure 3:
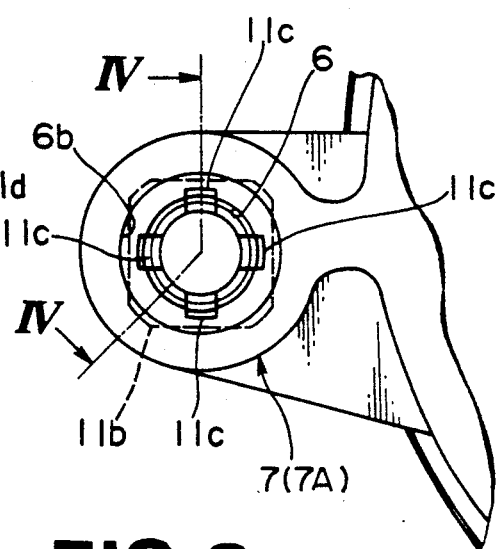

In this case, as shown in FIG. 4, the nut fitting hole 6 is formed with a flange receiving recess 6a in a first surface of said protruding portion to be engaged with the antirotative flange 11b of the nut 11 on the leftward end thereof illustrated in the figure, and formed with a major hole 6b in a second surface of said protruding portion parallel to said first surface on the rightward end thereof. The nut 11 is fixed so as not to move in the rotational or axial direction by bending said tabs 11c outwardly as also shown in FIG. 3 and pressing them to the major hole 6b at the state in which the antirotative flange 11b of the nut 11 is engaged in the flange receiving recess 6a of the nut fitting hole 6. When the nut 11 is secured in the hole, the end portions 11d of the nut 11 between the tabs 11c will be disposed substantially flush with the second surface of the protruding portion.

Additionally, the resinous gear case 1 is provided with the protruding portion 7, namely the nut fitting hole 6 in excess so as to enable the power window motor 20 to be disposed on another mounting position, the nut 11 is fixed to the protruding portion 7A selected properly among the protruding portions 7A excepting the protruding portion 7B.

Numeral 12 shown in FIG. 1 designates a cover for covering the resinous gear case 1, numeral 13 shown in FIG. 2 designates an output shaft.

An explanation will be given on the procedure for fixing the nut 11 in the resinous gear case 1.

First of all, the end of the nut 11 having tabs 11c into the nut fitting hole 6 of the resinous gear case 1 corresponding to the mounting position of the power window motor 20 for the motor vehicle from the side of the protruding portion having flange receiving recess 6a and the nut 11 is fitted into the nut fitting hole 6 so as to engage the antirotative flange 11b with said flange receiving part 6a.

Subsequently, by bending the tabs 11c of the nut 11 outwardly using a tool such as a punch and pressure them to the major hole 6b of the nut fitting hole 6, the nut 11 is fixed in the nut fitting hole 6 of the resinous gear case 1.

At this time, said nut 11 never rotates as the antirotative flange 11a is engaged to the flange receiving recess 6a of the nut fitting hole 6, and never moves in the axial direction as the tabs 11c are engaged in the major hole 6b of the nut fitting hole 6.

The power window motor 20 provided with the resinous gear case 1 fixed with the nuts 11 in such a manner is mounted on a motor setting bracket 27 shown in FIG. 4 in a broken line by screwing a bolt 26 shown by a broken line into the screw threads 11a of the nut 11 leftwardly from the right side in FIG. 4. Hereupon, since the motor setting bracket 27 comes to contact with the end portions 11d of the nut between the bent tabs 11c of the nut 11, the protruding portion 7 of the resinous gear case 1 is not applied with immoderate force and the protruding portion 7 is never cracked. This is due to the fact that the end portions 11d are substantially flush with the second surface of the protruding portion when the nut is secured therein.

While the invention has been explained by exemplifying the case of fixing the nut in the resinous gear case provided to the power window motor for the motor vehicle in this embodiment, this invention is not restricted to such embodiment.

Furthermore, it has been explained in this embodiment that the nut fitting hole 6 of the resinous gear case 1 is formed with the major hole 6b, and the bent tabs 11c of the nut 11 are engaged in said major hole 6b, but this invention is not restricted to this construction. The nut 11 may be fixed to the nut fitting hole 6 by embedding the bent tabs 11c into the inner periphery of the end of the nut fitting hole 6 without forming said major hole 6b. Also the front shape of the antirotative flange 11a of the nut 11 is not restricted to the rectangular shape, and available without distinction of the shape excepting a round shape.

As explained above, the nut fixing structure for the resinous case according to this invention comprises an antirotative flange provided to one end of a nut, a plurality of tabs provided to another end of said nut which can be bent outwardly, a nut fitting hole provided to the resinous case, a flange receiving recess provided to said nut fitting hole for engaging with the antirotative flange of said nut, and said nut being fixed to the nut fitting hole of the resinous case by bending the tabs of the nut outwardly at the state in which said nut is fitted into the nut fitting hole and said antirotative flange is engaged with the flange receiving recess of said nut fitting hole. Therefore, for example, in the case the resinous gear case provided to the power window motor for the motor vehicle is fixed to the motor setting bracket using the bolt at the time of mounting the motor on the vehicle body, it is possible to prevent the play between the motor and the motor setting bracket because the gap between the resinous gear case and the nut does not appear and the nut never becomes loose even in thermally severe environment, and it is possible to prevent the resinous gear case from the breakage such as the crack even when the bolt is tightend too much because the end of the nut on the bent tab end becomes in contact with the motor setting bracket. Accordingly, an excellent effect can be obtained that it is possible to reduce the cost because of good productivity in addition to above.

What is claimed is:

1. A nut and case assembly comprising:
a resinous case including at least one protruding portion having first and second substantially parallel surfaces, a nut receiving hole extending through said protruding portion and a recess in said first surface surrounding one end of said hole;
a nut having anti-rotative flange means at one end thereof; and
a plurality of bendable tabs provided on an opposite end of said nut and a plurality of contact pieces disposed between said bendable tabs respectively on said opposite end of the nut;
said nut being fixed to said protruding portion of said resinous case by bending said tabs of the nut outwardly when said nut is disposed in said hole with said anti-rotative flange means disposed in said recess, and said contact pieces having end portions disposed substantially flush with said second surface of said protruding portion when said nut is fixed to said protruding portion.

2. A nut and case assembly as set forth in claim 1, wherein said anti-rotative flange means and said recess for receiving said anti-rotative flange means have complementary polygonal shapes.

3. A nut and case assembly as set forth in claim 1, wherein a plurality of nut receiving holes are provided in said resinous case and a plurality of said nuts are provided for engagement in a selected number of said holes depending upon the configuration of a mounting bracket to which said case is adapted to be mounted.

4. A nut and case assembly as set forth in claim 3, wherein a minimum of five nut receiving holes are provided in said casing.

* * * * *